Oct. 17, 1944. W. W. LASKER, JR 2,360,610
TABULATING MACHINE
Filed July 16, 1940 3 Sheets-Sheet 1

INVENTOR
WILLIAM W. LASKER JR.
BY *H. A. Spark*
ATTORNEY

Oct. 17, 1944.   W. W. LASKER, JR   2,360,610
TABULATING MACHINE
Filed July 16, 1940   3 Sheets-Sheet 2
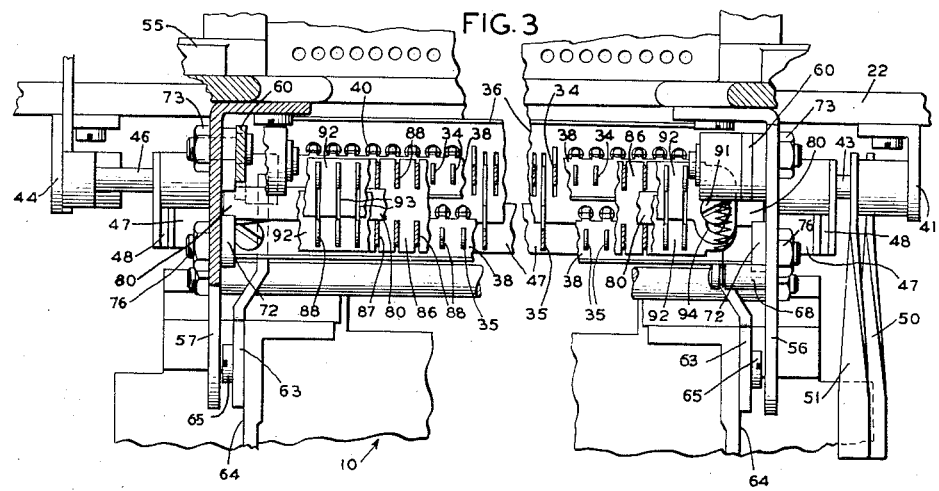
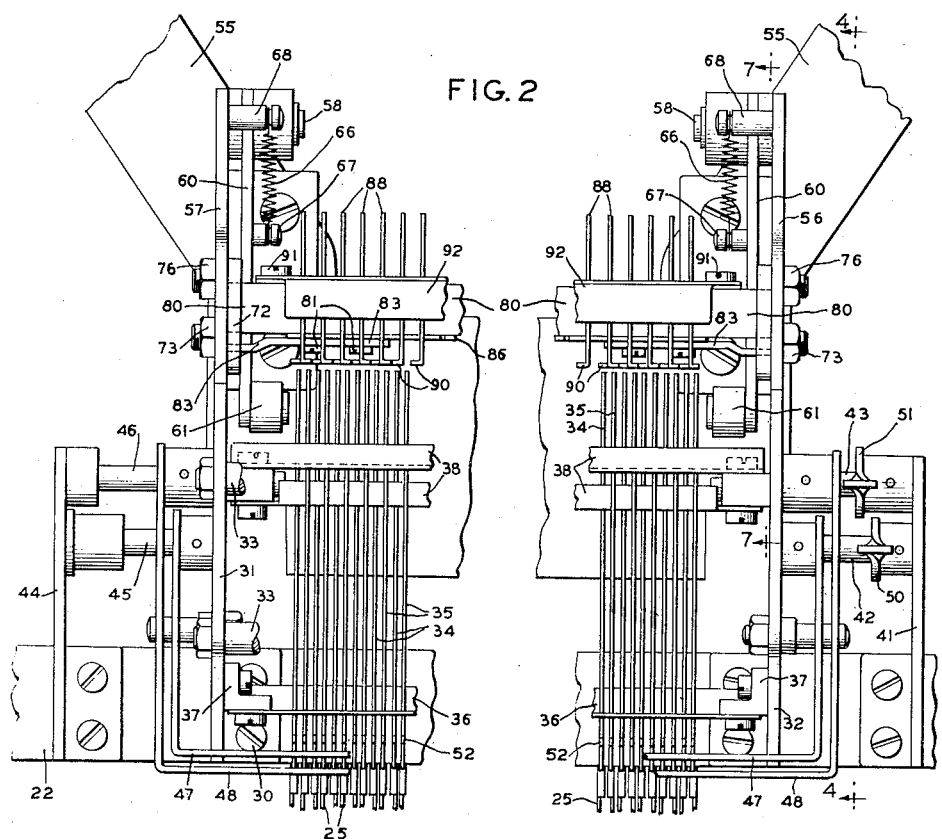
INVENTOR
WILLIAM W. LASKER JR.
BY W. A. Sparks
ATTORNEY Oct. 17, 1944.  W. W. LASKER, JR  2,360,610
TABULATING MACHINE
Filed July 16, 1940   3 Sheets-Sheet 3
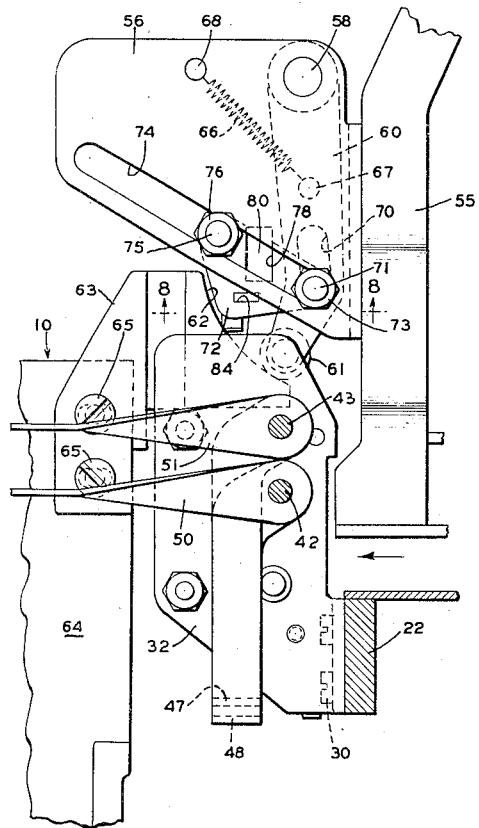
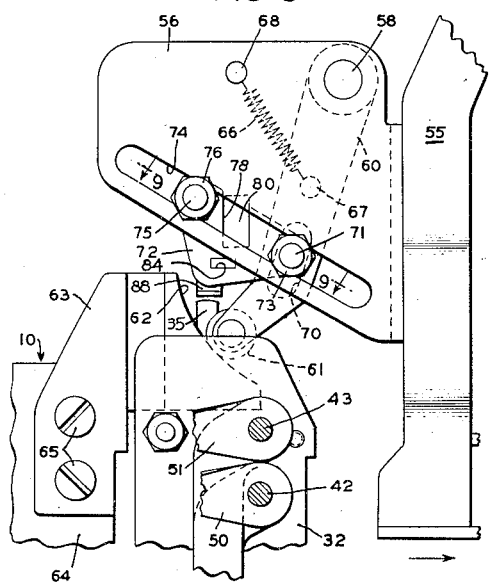
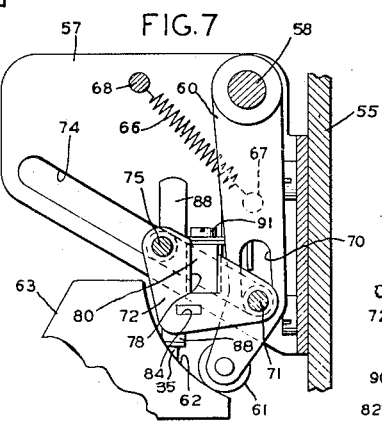
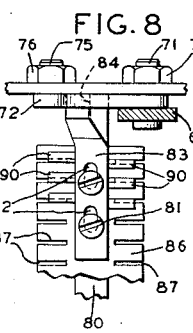
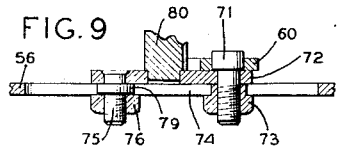
INVENTOR
WILLIAM W. LASKER JR.
BY W. A. Sparks
ATTORNEY Patented Oct. 17, 1944

2,360,610

UNITED STATES PATENT OFFICE 2,360,610

TABULATING MACHINE

William W. Lasker, Jr., Brooklyn, N. Y., assignor to Remington Rand Inc., Buffalo, N. Y., a corporation of Delaware Application July 16, 1940, Serial No. 345,707

13 Claims. (Cl. 235—61.7)

This invention relates to improvements in tabulating machines and more particularly to mechanism for controlling the total taking operations thereof.

The invention described herein is shown embodied in a tabulating machine of the type shown and described in Patent 2,323,816 to William W. Lasker, Jr., executor, and John Mueller, dated July 6, 1943. However, while the invention is herein embodied in the above type of machine, it will be understood that the same may be used in connection with any other type of tabulating machine without departing from the scope of the invention.

It is well established in the Powers tabulating machine art that the machine will automatically set instrumentalities for operation upon a change of designation which may cause the machine to execute a plurality of total taking operations. This is accomplished by the use of the change-of-designation mechanism which includes a plurality of interponents manually settable to individually cooperate with slides in the retaining device, which slides are moved according to the data sensed in a punched card. The interponents are manually settable to their total or grand total position and, when the interponents so set are operated by the slides, they move either of two bails which set the machine for total or grand total operations.

In tabulators of this type a translator is provided for each type of problem to be carried out in the machine, and each is wired according to the type of data to be sensed in the card and according to the use to be made of such data. Before a particular group of cards is fed through the machine, the proper translator is inserted therein and a setting is made in the change-of-designation mechanism so as to control the machine in the taking of totals. This setting usually remains the same throughout the use of said translator. When a new translator is used because of a new problem to be performed, the setting in the change-of-designation mechanism is changed to correspond to the new problem.

While the above practice is a correct one, it will be seen that for each change of the translator or new set of cards containing a new type of information, the operator of the machine must change the setting of the change of designation device before proceeding with the operation of the machine.

This may take considerable time to perform, during which time the machine is idle. Also, with the above construction the operator of the machine must be of a highly skilled type in order to set the interponents in their correct position according to the problem on hand.

With the present device the time for preparing a tabulating machine to perform its different problems is cut to a minimum and also does away with the highly technical setting up of the interponents by the operator. This is accomplished by mounting upon each translator, supplied with the tabulator, a manually settable mechanism which, when the translator is moved to home position in the tabulator, sets up the interponents to their desired positon. The above settable mechanism consists of a plurality of settable members which may be set to a desired one of three positions, i. e., total, grand total, and normal position, at the time the translator is assembled. These settable members are mounted in the translator in such a manner that when the translator is being moved into the tabulator, the members are lowered a predetermined distance. With the translator in home position, each of the preselected settable members is in vertical alignment with the corresponding interponents so that when the members are lowered they in turn lower the corresponding interponents to their proper position. In this position, when a change-of-designation occurs, a proper total taking operation of the machine will result.

An object of this invention is to eliminate the necessity of manually resetting the change-of-designation mechanism for each different type of problem to be performed.

Another object of this invention is to minimize the time to prepare a tabulating machine to perform its total taking operations.

Still another object of this invention is to simply and conveniently cause the change of designation set-up to be made by the insertion of the translator into the tabulator.

Other objects and structural details will be apparent from the following description when read in connection with the accompanying drawings in which:

Fig. 2 is a partial front elevational view in cross section taken substantially along the lines 2—2 of Fig. 1;

Fig. 3 is a partial top plan view of Fig. 2;

Fig. 4 is a partial right-hand cross sectional elevational view taken substantially along the lines 4—4 of Fig. 2, diclosing the position of the settable mechanism when the translator is in home position;

Fig. 5 is a view similar to Fig. 4 but with the translator partly removed from home position;

Fig. 6 is a detail right-hand cross sectional view showing the interponents moved to total and grand total positons;

Fig. 7 is a detail cross sectional view of the invention taken substantially along the lines 7—7 of Fig. 2;

Fig. 8 is a detail cross sectional view taken along the lines 8—8 of Fig. 4; and Fig. 9 is a cross sectional view taken along the lines 9—9 of Fig. 5.

Figure 1:
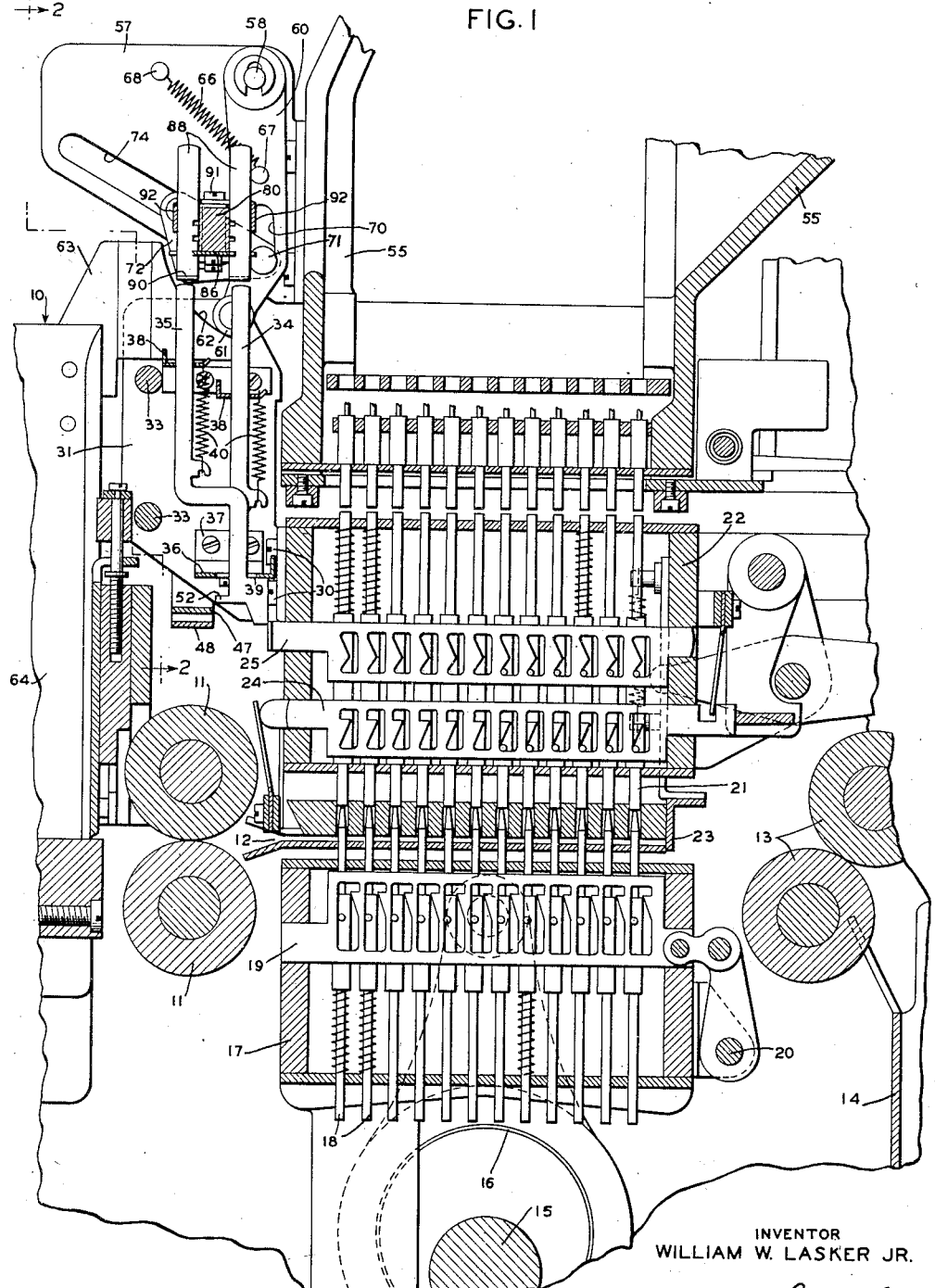
Fig. 1 is a cross sectional elevational view taken from the right-hand side of the machine disclosing a portion of the base and intermediate sections of a tabulating machine in connection with the present invention.

The base section of the machine, shown in Fig. 1, is the same in its essential features of drive mechanism and card feeding and sensing mechanism as that described in the above mentioned patent and need not be described in great detail herein. The stack of pre-grouped cards are fed seriatim from a magazine 10 by means of the usual picker, not shown, and thence by means of feed rolls 11 into the sensing chamber 12 wherein they are sensed, and, finally by means of pressure rolls, not shown, and eject rolls 13 the sensed cards are ejected into an eject pocket 14. A main base shift 15 (110 in the above patent) makes one revolution for each cycle of the machine and carries eccentrics 16 for reciprocating a pin box 17 up and down. This pin box contains sensing pins 18 for sensing the perforations in a card and locking slides 19 therefor, which slides are slid to locking and retract position by a bail mounted upon a shaft 20, which shaft is operated once per cycle. The sensing pins 18 are adapted to cooperate with set-pins 21 in the set-pin or registering pin-box 22 containing the card chamber 12 through which the card is fed.

A card stop 23, operated in the usual manner, retains the card in the sensing chamber while it is sensed. When the set-pins 21 are raised by the sensing pins 18, they are locked in their elevated position by locking slides 24 which are spring-pressed to active position at about the end of a machine cycle.

Provided for each front to rear row of set-pins 21 are two of the locking slides 24, one of said slides having locking teeth only for the rear six set-pins corresponding to the upper zone of the card and the other for the forward six set-pins coresponding to the lower zone of the card. Also, each of the front to rear rows of set-pins 21 has two change-of-designation detecting slides 25, one having detecting noses or cams cooperating with extensions on only the rear six set-pins and the other cooperating with extensions on only the forward six set-pins.

Secured to the front side of the registering pin-box 22 by screws 30 is a pair of upright frame brackets 31 and 32 (Figs. 1 and 2) made rigid by a pair of tie rods 33. Located between the side brackets 31 and 32 is a plurality of interponents 34 and 35 (90 in number) which are adapted to be actuated by the change detecting slides 25. The lower portions of said interponents are guided for vertical and horizontal movement in a comb plate 36 secured at its ends to right-angled blocks 37 which are, in turn, secured to the brackets 31 and 32. The arrangement of the interponents is such that the interponents 34 cooperate with the detecting slides operated by the set-pins for the upper zone of the card and the interponents 35 cooperate with the detecting slides operated by the set-pins for the lower zone of the card. The interponents 34 and 35 alternate with each other across the machine and extend vertically in the manner shown to form two rows (45 in each row) at the upper portion thereof. The interponents in each row are guided for vertical movement in combs 38 formed integral with each other and which are mounted upon the brackets 31 and 32. Individual springs 40 are provided for urging the interponents in an upward direction, one end of said springs being connected to its associated interponent and the other end to its associated comb 38. The lower portion of each interponent is provided with a shoulder 39 (Figs. 1 and 6) which contacts the lower face of the comb 36, thereby limiting the upward movement thereof.

It will be noted at this time that the total taking control unit used in connection with this invention is similar to that disclosed in the above mentioned patent and only so much as is necessary for an understanding of the present invention is herein shown and described.

Journaled at one of their ends in the bracket 32 (Fig. 2) and at their other ends in another bracket 41, secured to the registering pin-box 22, is a pair of shafts 42 and 43, and journaled at one of their ends in the bracket 31 and at their other ends in another bracket 44, secured to the registering pin-box, is another pair of shafts 45 and 46. The shafts 42 and 45 together serve the same purpose as the total rock shaft 580 in the above mentioned patent and the shafts 43 and 46 serve the same purpose as the grand total rock shaft 587 in the above mentioned patent.

Secured to the shaft 42 is one arm of a bail 47 while the other arm of said bail is secured to the shaft 45. Another bail 48 is provided, one arm of which is fixed to the shaft 43 and the other arm fixed to the shaft 46. The bails 47 and 48 are the equivalent of the bails 579 and 585 respectively in the above mentioned patent.

Also secured to their respective shafts 42 and 43 are arms 50 and 51 (636 and 662 in the above patent) which, when the shafts are rocked, by means to be described, initiate a total or grand total operation of the machine as is fully described in the above patent.

Normally, when the interponents 34 and 35 are in their uppermost position (Fig. 1), a toe 52 formed at their lower portion lies out of the path of the bails 47 and 48. When any one of the interponents 34 and 35 is moved downwardly by means to be described, a distance of one unit, the toe 52 of the moved interponent assumes a position in register with the bail 47 so that, upon a change-of-designation in the column corresponding to the moved interponent, the detecting slide 25 moves the interponent and the bail to the left (Fig. 1) causing the initiation of a total operation. When any one of the interponents is moved downwardly a distance of two units, the toe 52 thereof will assume a position in register with the bail 48 so that, when a change-of-designation occurs in the column corresponding to the moved interponent, the associated slide will move the interponent and bail to the left to cause the initiation of a grand total operation.

The above mechanism for conditioning the machine for a total or grand total operation is substantially the same as that described in the above mentioned patent and need not be further described herein. The following is a description of the mechanism for moving the interponents 34 and 35 to their total or grand total position, which mechanism forms the subject matter of the present invention.

Adjustably secured to the front wall of a translator frame 55 (234 in the above patent) is a pair of forwardly extending brackets 56 and 57 (Figs. 1 and 2) each of which has secured thereon an inwardly extending stub shaft 58. Each stub shaft has rotatably mounted thereon a downwardly extending arm 60 having a roller 61, mounted at its lower end thereof, which is adapted to ride upon a cam surface 62 formed in a bracket 63. The brackets 63 are secured to side walls 64 of the magazine 10 by screws 65. Springs 66, having one end connected to a pin 67 on the arm 60 and the other end to a pin 68 on its corresponding bracket, urge the arms in a clockwise direction in order that the roller on the arm may ride on the cam surface 62.

Each arm 60 is provided with a slot 70 in which rides the enlarged end portion of a shouldered stud 71 (Fig. 9). The reduced portion of this stud passes through a plate 72 and is secured thereon by means of a shouldered nut 73, the reduced portion of which rides in an inclined slot 74 formed in the brackets 56 and 57. Each plate 72 is located between the arm 60 and its associated bracket and has riveted thereon a stud 75 having an enlarged portion 79 also adapted to ride in the slot 74. The stud 75 is threaded to receive a nut 76 to prevent lateral displacement of the plate 72. From the above description, it will be seen that when the arms 60 move in a clockwise direction (Fig. 5), under the tension of the springs 66, the studs 71 in the slots 70 are picked up and moved upwardly along the inclined slots 74, thus moving the plates 72 in an upward and forward direction, the studs 75 acting as supports for the plates 72.

Referring more particularly to Figs. 2, 3, 7, 8, and 9, the plates 72 are provided with cutout portions 78 to receive the ends of a cross bar 80. In order to securely hold the ends of the cross bar 80 in their respective cutout portions 78, the bar has adjustably secured to the underside of each end thereof, by means of screws 81 and slots 82 (Fig. 8), a lock bar 83, one end of which is adapted to be inserted in a slot 84 formed in its associated plate 72.

Also secured by the screws 81 to the underside of the cross bar 80 and located between it and the bars 83 is a comb plate 86 (Figs. 1 and 8) having two rows of slots 87, there being forty-five slots in each row. Each slot is adapted to guide, for vertical and horizontal movement, a corresponding settable key 88 formed at its lower end thereof with a bent over lug 90, the lugs formed on one row of keys extending to the left (Figs. 1 and 2) and the lugs formed on the other row of keys extending to the right. The above construction is such that the keys are spaced the same distance apart as are the interponents 34 and 35 so that when the translator is in its home position as shown in Fig. 1, the lugs on the keys 88 and the interponents 34 and 35 will be in vertical alignment.

Secured to the upper side of the cross bar 80 (Figs. 1, 3, and 6) by screws 91 is a pair of L-shaped key locks 92 provided at one side thereof with a plurality of guide slots 93 through which the upper portion of the settable keys 88 extend. The other side or wall of the L-shaped locks 92 extends downwardly for the purpose of retaining the keys 88 in set position. The settable keys 88 are each provided with notches "A," "B," and "C" (Fig. 6), which are adapted to receive an edge of its respective slot 87 in the comb plate 86.

The key locks 92 are each provided at their ends with a slot 94 (Fig. 3) through which the screws 91 pass and by which the locks may be offset.

Summarizing the above description, the invention may be used in the following manner:

The pre-setting of the keys 88 is made when the translator is out of home position, i. e., entirely removed from its respective tabulator. In this position, the arms 60 are urged in a clockwise direction by the springs 66 and are limited in this movement by the engagement of the enlarged portion 79 of the studs 75 with the forward end of the slots 74.

It will be noted at this time that the settable keys are in a normal ineffective position when their notches "A" are in engagement with the edges of their respective slots 87 as shown in Fig. 1. With the set-up mechanism in the above position, assume that it is desired to initiate a grand total operation when a change of designation occurs in the twenty-third column and to initiate a total operation when a change of designation occurs in the fifty-sixth column.

In order that this change may be transferred to the total control unit above referred to, the screws 91 which secure the key locks 92 are given a slight turn so that the locks may be moved, by virtue of their respective slots 94, to a position wherein the settable keys are movable away from the cross bar 80 and the edges of the comb slots 87. The settable keys are now in position to be pre-set according to the above problem. The key corresponding to the twenty-third column of the card is moved so that its notch "A" is free from the edge of its respective slot. The key is then lowered to a position wherein its notch "C" is opposite the edge of its respective slot and then brought into engagement therewith as is shown in Fig. 6. In a similar manner the key corresponding to the fifty-sixth column of the card is brought down to a position in which its notch "B" is brought into engagement with the edge of its respective slot 87. When the keys are in the above mentioned position, the key locks 92 are then brought to a position wherein their downwardly projecting side walls retain all the settable keys in their set position and the screws 91 tightened.

The translator is now in condition to be inserted in the tabulator. As the translator is thus moved, the rollers 61 on their respective arms 60 contact respective cam surfaces 62 which cause the arms 60 to be rocked in a counter-clockwise direction against the tension of the springs 66 as shown in Fig. 5. The counter-clockwise movement of the arms 60 moves, through studs 71, the plates 72 and consequently moves the settable pins 88 in a downwardly direction. The construction of the above mechanism is such that when the pins 88 are moved downwardly as above described, all those pins which have not been pre-set and which are in the "A" position assume a position wherein their lugs lie directly above and slightly spaced away from their cooperating interponents 34 and 35. However, those keys which have been pre-set as above described will act upon their respective interponents as follows: The lug on the key 88 which was set to its "C" or "grand total" position, will, when said key is lowered, engage its corresponding interponent 34 and move said interponent to a position wherein its lug 52 is in register with the bail 48 (Fig. 6). The lug on the key 88, which was set to its "B" or "total" position will engage its corresponding interponent and move the same so that its lug is brought in register with the bail 47.

The machine is now ready for operation and when a change of designation occurs in either the twenty-third or the fifty-sixth column, the lugs 52 of the respective interponents 34 or 35 operate the bails 47 or 48, and thus cause initiation of a total or grand total taking operation in the machine. After the operator of the tabulating machine is through with the use of the translator having the above setting, a new translator with the set-up device arranged for a new problem is put into the machine as before. With the above arrangement the operator of the tabulating machine does not need to set up the change-of-designation mechanism as the pre-setting is made at the time that the translator is assembled.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a tabulator, means including a reciprocating element for detecting differences in consecutive data records, a device arranged when actuated to initiate total taking operations, an interponent movable from a normal ineffective position to an effective position to transmit movement of said reciprocating element to said device, a removable translator, an element settable to a predetermined effective position, means mounted upon said translator for supporting said settable element, and means on said machine adapted to cooperate with said supporting means in a manner to move said supporting means and said settable element to an operative position as said translator is inserted in the machine, said settable element thereby, when set to its effective position, moving and holding said interponent in its effective transmitting position.

2. In a tabulator, a slide movable upon the detection of differences in consecutive data records, a device operable to initiate total taking operations, an interponent movable from a normal ineffective position to an effective position to transmit movement of said slide to said device, a removable translator, an element settable to a predetermined effective position, means mounted upon said translator for supporting said settable element, said supporting means and said settable element being biased to an inoperative position when said translator is removed from the machine, and means on said machine adapted to cooperate with said supporting means in a manner to move said supporting means and said settable element to an operative position as said translator is inserted in the machine, said settable element thereby, when set to its effective position, moving and holding said interponent in its effective transmitting position.

3. In a tabulating machine controlled by data records having columns of perforations contained therein, the combination of means including a slide for each of said columns for detecting differences in consecutive data records, an interponent for each of said slides and movable from a normal ineffective position to an effective position to transmit movement thereof, a bail member operable to initiate a total taking operation of said machine, said bail member being common to said interponents and operable thereby, a removable translator, an element for each of said interponents and settable to a predetermined effective position, means mounted upon said translator for supporting said settable elements, and means on said machine adapted to cooperate with said supporting means in a manner to move said supporting means and said settable elements to an operative position as said translator is inserted in the machine, said elements thereby, when set to their effective position, moving and holding their associated interponents in their effective transmitting positions.

4. In a card controlled tabulator, the combination of means for detecting differences in consecutive data records, a pair of bails, each operable to initiate a distinctive total taking operation of the machine, an interponent movable from a normal ineffective position to one effective position to transmit movement of said detecting means to one of said bails and movable to another position to transmit movement of said detecting means to the other of said bails, a removable translator, an element settable to one of a plurality of effective positions, means mounted upon said translator for supporting said settable element, and means on said machine adapted to cooperate with said supporting means in a manner to move said supporting means and said settable element to an operative position as said translator is inserted in the machine, said settable element thereby moving and holding said interponent in an effective position to transmit movement to one of said bails in accordance with the position in which said settable element is set.

5. In a card controlled tabulator, the combination of means for detecting differences in consecutive data records, a pair of bails, each operable to initiate a distinctive total taking operation of the machine, an interponent movable from a normal ineffective position to one effective position to transmit movement of said detecting means to one of said bails and movable to another effective position to transmit movement of said detecting means to the other of said bails, a removable translator, an element settable to one of two effective positions, means mounted upon said translator for supporting said settable element, said supporting means and said settable element being biased to inoperative position when said translator is removed from the machine, and means on said machine adapted to cooperate with said supporting means in a manner to move said supporting means and said settable element to an operative position as said translator is inserted in the machine, said settable element thereby, when set to one of its effective positions, moving and holding said interponent in its effective position to transmit movement to one of said bails in accordance with the position in which said settable element is set.

6. In a card controlled tabulator, the combination of means for detecting differences in consecutive data records, a pair of bails, one operable to initiate a total taking operation of the machine and the other operable to initiate a grand total operation of the machine, an interponent movable from a normal ineffective position to an effective position to transmit movement of said detecting means to one of said bails and movable to another effective position to transmit movement to the other of said bails, a removable translator, an element settable to one of two effective positions, means mounted upon said translator for supporting said settable element, said supporting means and said settable element being biased to inoperative position when said translator is removed from the machine to permit presetting of said settable element, and means on said machine adapted to cooperate with said supporting means in a manner to move said supporting means and said settable element to an operative position as said translator is inserted in the machine, said settable element thereby, when set to one of its effective positions, moving and holding said interponent in one of its effective positions to transmit movement to one of said bails in accordance with the position in which said settable element is preset.

7. In a tabulator, means including a slide for detecting differences in consecutive data records, a bail arranged when actuated to initiate total taking operations, an interponent normally biased to ineffective position and movable to effective position to transmit movement of said slide to said bail, a removable translator, followers pivoted upon said translator, a key settable to a predetermined effective position, a bar connecting said followers and supporting said settable key, and a cam on the machine adapted to cooperate with said followers in a manner to move said bar and said settable key to an operative position as said translator is inserted in the machine, said settable key thereby, when set to its effective position, moving and holding said interponent in its effective transmitting position.

8. In a tabulator, means including a reciprocating element for detecting differences in consecutive data records, a device arranged when actuated to initiate total taking operations, an interponent movable from a normal ineffective position to an effective position to transmit movement of said reciprocating element to said device, a removable translator, followers pivoted upon said translator, a key settable to a predetermined effective position, a bar connecting said followers and supporting said settable key, and means on the machine adapted to cooperate with said followers in a manner to move said bar and said settable key to an operative position as said translator is inserted in the machine, said settable key, thereby when set to its effective position, moving and holding said interponent in its effective transmitting position.

9. In a tabulator, a slide movable upon the detection of differences in consecutive data records, a device operable to initiate total taking operations, an interponent movable from a normal ineffective position to an effective position to transmit movement from said slide to said device, a removable translator, followers pivoted upon said translator, a key settable to a predetermined effective position, a bar connecting said folowers and supporting said settable key, said followers and connecting bar being biased to inoperative position when said translator is removed from the machine, and means on the machine adapted to cooperate with said followers in a manner to move said bar and said settable key to an operative position as said translator is inserted in the machine, said settable key thereby, when set to its effective position, moving and holding said interponent in its effective transmitting position.

10. In a tabulating machine controlled by data records having columns of perforations contained therein, a combination of means including a slide for each of said columns for detecting differences in consecutive data records, an interponent for each of said slides and movable from a normal ineffective position to an effective position to transmit movement thereof, a bail member operable to initiate a total taking operation of said machine, said bail member being common to said interponents and operable thereby, a removable translator, followers pivoted upon said translator, a key for each of said interponents and settable to a predetermined effective position, a bar connecting said followers and supporting said settable keys, and means on the machine adapted to cooperate with said followers in a manner to move said bar and said settable keys to an operative position as said translator is inserted in the machine, said settable keys thereby, when set to their effective position, moving and holding their associated interponents in their effective transmitting positions.

11. In a card controlled tabulator, a combination of means for detecting differences in consecutive data records, a pair of bails, each operable to initiate a distinctive total taking operation of the machine, an interponent movable from a normal ineffective position to an effective position to transmit movement of said detecting means to one of said bails and movable to another position to transmit movement of said detecting means to the other of said bails, a removable translator, followers pivoted on said translator, a key settable to one of a plurality of effective positions, a bar connecting said followers and supporting said settable key, and means on the machine adapted to cooperate with said followers in a manner to move said bar and said settable key to an operative position as said translator is inserted in the machine, said settable key thereby moving and holding said interponent in an effective position to transmit movement to one of said bails in accordance with the position in which said settable key is set.

12. In a card controlled tabulator, the combination of means for detecting differences in consecutive data records, a pair of bails, each operable to initiate a distinctive total taking operation of the machine, an interponent movable from a normal ineffective position to an effective position to transmit movement of said detecting means to one of said bails and movable to another effective position to transmit movement of said detecting means to the other of said bails, a removable translator, followers pivoted upon said translator, a key settable to one of two effective positions, a bar connecting said followers and supporting said settable key, said followers and said bar being biased to inoperative position when said translator is removed from the machine, and means on said machine adapted to cooperate with said followers in a manner to move said bar and said settable key to an operative position as said translator is inserted in the machine, said settable key thereby, when set to one of its effective positions, moving and holding said interponent in its effective position to transmit movement to one of said bails in accordance with the position in which said settable key is set.

13. In a card controlled tabulator, the combination of means for detecting differences in consecutive data records, a pair of bails, one operable to initiate a total taking operation of the machine and the other operable to initiate a grand total operation of the machine, an interponent movable from a normal ineffective position to an effective position to transmit movement of said detecting means to one of said bails and movable to another effective position to transmit movement to the other of said bails, a removable translator, followers pivoted upon said translator, a key settable to one of two effective positions, a bar connecting said followers and supporting said settable key, said followers and said bar being biased to inoperative position when said translator is removed from the machine to permit presetting of said settable key, and means on said machine adapted to cooperate with said followers in a manner to move said bar and said settable key to an operative position as said translator is inserted in the machine, said settable key thereby, when set to one of its settable positions, moving and holding said interponent in one of its effective positions to transmit movement to one of said bails in accordance with the position in which said settable key is preset.

WILLIAM W. LASKER, Jr.